(12) United States Patent
Bai et al.

(10) Patent No.: US 9,084,250 B2
(45) Date of Patent: Jul. 14, 2015

(54) METHOD AND DEVICE FOR CONFIGURING CENTRAL SUBCARRIER

(71) Applicant: Huawei Technologies Co., Ltd., Shenzhen (CN)

(72) Inventors: Wei Bai, Shenzhen (CN); Lei Wan, Shenzhen (CN); Sha Ma, Shenzhen (CN); Zhiyu Yan, Shenzhen (CN); Zheng Yu, Shenzhen (CN); Lixia Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 13/673,515

(22) Filed: Nov. 9, 2012

(65) Prior Publication Data

US 2013/0070708 A1    Mar. 21, 2013

Related U.S. Application Data

(63) Continuation of application No. PCT/CN2011/073954, filed on May 11, 2011.

(30) Foreign Application Priority Data

May 11, 2010 (CN) .......................... 2010 1 0178325

(51) Int. Cl.
H04W 72/04 (2009.01)
H04L 5/00 (2006.01)

(52) U.S. Cl.
CPC ........... *H04W 72/042* (2013.01); *H04L 5/0053* (2013.01); *H04L 5/0073* (2013.01)

(58) Field of Classification Search
CPC ...... H04W 72/04; H04W 88/08; H04W 76/00
See application file for complete search history.

(56) References Cited

U.S. PATENT DOCUMENTS

2006/0171354 A1* 8/2006 Tee et al. .................. 370/329
2008/0165743 A1* 7/2008 Palanki et al. ............ 370/335

(Continued)

FOREIGN PATENT DOCUMENTS

CN     1960557 A    5/2007
CN   101183920 A    5/2008

(Continued)

OTHER PUBLICATIONS

Extended European Search Report issued in corresponding European Patent Application No. 11780204.1, mailed May 7, 2013.

(Continued)

*Primary Examiner* — Hassan Phillips
*Assistant Examiner* — Prenell Jones
(74) *Attorney, Agent, or Firm* — Brinks Gilson & Lione

(57) ABSTRACT

A method and a device for configuring a central subcarrier are disclosed. The method comprises: mapping a first downlink control channel onto a part (f1) of a downlink bandwidth (fW) of a cell, and configuring a first virtual central subcarrier in f1, where f1 is different or partly different from a bandwidth f2 mapped to a second downlink control channel, an overlap between f1 and f2 is at least one subcarrier, or at least one idle subcarrier exists between f1 and f2, or at least one non-idle subcarrier and at least one idle subcarrier exist between f1 and f2; the first virtual central subcarrier is located on a grid position of a central frequency, a distance between the first virtual central subcarrier and a second virtual central subcarrier configured in f2 is an integer multiple of a frequency domain width of the subcarrier.

18 Claims, 15 Drawing Sheets

(56) References Cited

U.S. PATENT DOCUMENTS

| | | | |
|---|---|---|---|
| 2009/0016291 | A1 | 1/2009 | Oota et al. |
| 2009/0073929 | A1* | 3/2009 | Malladi et al. ............. 370/329 |
| 2011/0064041 | A1* | 3/2011 | Hooli et al. ............... 370/329 |
| 2011/0128942 | A1* | 6/2011 | Kim et al. ................. 370/336 |
| 2011/0261774 | A1* | 10/2011 | Lunttila et al. ............ 370/329 |
| 2012/0051311 | A1* | 3/2012 | Kim et al. ................. 370/329 |

FOREIGN PATENT DOCUMENTS

| | | |
|---|---|---|
| CN | 101272171 A | 9/2008 |
| CN | 101616118 A | 12/2009 |
| KR | 20050051865 A | 6/2005 |
| WO | WO 2005/053198 A2 | 6/2005 |
| WO | WO 2007/108077 A1 | 9/2007 |

OTHER PUBLICATIONS

Nokia, "Broadcast Channel (BCH) Structure and Performance" Agenda Item 8.3.3, 3GPP TSG WG1 #46 Meeting. Tallin, Estonia, Aug. 28-Sep. 1, 2006. R1-062352.

CMCC, "Downlink Interference Coordination Between Femto Cells" Agenda Item 6.8, 3GPP TSG-RAN WG1 Meeting #61bis. Beijing, China, Apr. 12-16, 2010. R1-102160.

Intel Corporation (UK) Ltd., "Non-CA based PDCCH Interference Mitigation in LTE-A" Agenda Item 6.8, 3GPP TSG RAN WG1 Meeting #61. Montreal, Canada, May 10-14, 2010. R1-102814.

Motorola, "On Range Extension in Open-Access Heterogeneous Networks" Agenda Item 6.8, 3GPP TSG RAN1#61. Montreal, Canada, May 10-14, 2010. R1-103181.

Huawei, "Enhanced ICIC for Control Channels to Support HetNet" Agenda Item 6.8., 3GPP TSG RAN WG1 meeting #61. Montreal, Canada, May 10-14, 2010. R1-10xxxx.

International Search Report issued in corresponding PCT Patent Application No. PCT/CN2011/073954, mailed Aug. 18, 2011.

Written Opinion of the International Searching Authority issued in corresponding PCT Patent Application No. PCT/CN2011/073954, mailed Aug. 18, 2011.

Motorola, "Reliable Downlink Control for Heterogeneous Networks" Agenda Item 7.7. 3GPP TSG RAN1 #58bis. Miyazaki, Japan, Oct. 12-16, 2009. R1-093971.

* cited by examiner

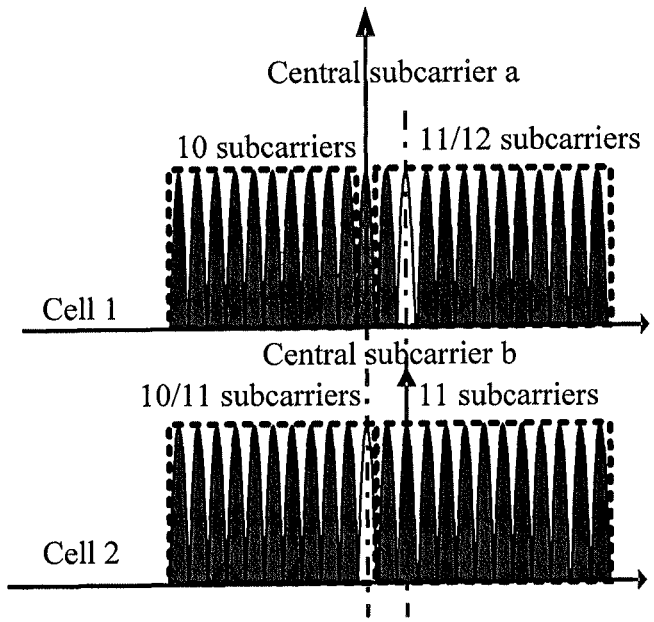

FIG. 9

Map a first downlink control channel onto a part (f1) of a downlink bandwidth (fW) of a cell, and configure a first virtual central subcarrier in f1, where f1 is different from a bandwidth (f2) mapped to a second downlink control channel, at least one idle subcarrier exists between f1 and f2, or at least one non-idle subcarrier and at least one idle subcarrier exist between f1 and f2; the first virtual central subcarrier is located on a grid position of a central frequency, a distance between the first virtual central subcarrier and a second virtual central subcarrier allocated in f2 is an integer multiple of a frequency domain width of the subcarrier, and borders of physical resource blocks (PRBs) are aligned between the cell and a neighboring cell

1001

Map a downlink data channel onto fW of the cell, and configure a central subcarrier on fW

METHOD AND DEVICE FOR CONFIGURING CENTRAL SUBCARRIER

CROSS-REFERENCE TO RELATED APPLICATIONS

This application is a continuation of International Application No. PCT/CN2011/073954, filed on May 11, 2011 which claims priority to Chinese Patent Application No. 201010178325.0, filed on May 11, 2010, both of which are hereby incorporated by reference in their entireties.

FIELD OF TECHNOLOGY

The present invention relates to the field of communication technologies and, in particular, to a method and a device for configuring a central subcarrier.

BACKGROUND

In a communication system, the control channels between cells interfere with each other, which disrupts user services. Therefore, to solve the cross interference of control channels between cells, two cells may use orthogonal transmission of downlink control channels to transmit control channels of the user. For example, in cell 1, the downlink control channel (PDCCH) is transmitted within an f1 frequency range. Therefore, for a user of a new communication system, the downlink control channel (PDCCH) falls within the f1 frequency range, and the downlink shared channel (PDSCH) falls within the entire downlink bandwidth frequency range. In cell 2, the PDCCH is transmitted within an f2 frequency range. Therefore, for the user of the new communication system, the downlink control channel (PDCCH) falls within the f2 frequency range, and the downlink shared channel (PDSCH) falls within the entire downlink bandwidth frequency range. There may be no overlap or an overlap part between the f1 frequency range and the f2 frequency range. In this way, the frequency of the PDCCH of cell 1 is completely or partly orthogonal to the frequency of the PDCCH of cell 2, which prevents neighboring cell interference to the control channel and improves the receiving performance of the control channel.

Besides, in the new communication system, a multi-carrier transmission technology may provide wider bandwidth, or a single carrier is divided into multiple carriers so that inter-cell interference coordination is accomplished through inter-carrier coordination. The user in the new communication system can access multiple carrier units simultaneously.

In the prior art, the new communication system is not backward-compatible in the case of orthogonal transmission of the downlink control channel or multi-carrier transmission. Consequently, the existing communication system that does not support orthogonal transmission or multi-carrier transmission is unable to work normally.

SUMMARY

The present invention provides a method and a device for configuring a central subcarrier. The central subcarrier is configured in the case of orthogonal transmission of the downlink control channel or multi-carrier transmission so that the existing communication system works normally.

A method for configuring a central subcarrier is provided in one aspect of embodiments of the present invention. The method comprises:

mapping a first downlink control channel onto a part (f1) of a downlink bandwidth (fW) of a cell, and configuring a first virtual central subcarrier in f1, where f1 is different or partly different from a bandwidth (f2) mapped to a second downlink control channel, an overlap between f1 and f2 is at least one subcarrier, or at least one idle subcarrier exists between f1 and 12, or at least one non-idle subcarrier and at least one idle subcarrier exist between f1 and 12; the first virtual central subcarrier is located on a grid position of a central frequency, a distance between the first virtual central subcarrier and a second virtual central subcarrier configured in f2 is an integer multiple of a frequency domain width of the subcarrier, and borders of physical resource blocks (PRBs) are aligned between the cell and a neighboring cell; and mapping a downlink data channel onto fW of the cell, and configuring a central subcarrier on fW.

A device for configuring a central subcarrier is provided in another aspect of embodiments of the present invention. The device comprises:

a first mapping and configuring module, configured to: map a first downlink control channel onto a part (f1) of a downlink bandwidth (fW) of a cell, and configure a first virtual central subcarrier in f1, where f1 is different or partly different from a bandwidth (f2) mapped to a second downlink control channel, an overlap between f1 and f2 is at least one subcarrier, or at least one idle subcarrier exists between f1 and f2, or at least one non-idle subcarrier and at least one idle subcarrier exist between f1 and f2; the first virtual central subcarrier is located on a grid position of a central frequency, a distance between the first virtual central subcarrier and a second virtual central subcarrier configured in f2 is an integer multiple of a frequency domain width of the subcarrier, and physical resource blocks (PRBs) are aligned between the cell and a neighboring cell; and a second mapping and configuring module, configured to map a downlink data channel onto fW of the cell, and configure a central subcarrier on fW.

Through the method and the device for configuring a central subcarrier in the embodiments of the present invention, the central subcarrier is configured in the case of orthogonal transmission of the downlink control channel or multi-carrier transmission so that the existing communication system works normally.

BRIEF DESCRIPTION OF THE DRAWING(S)

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

FIG. 9 is a distribution diagram of a part of frequencies of a method for configuring a central subcarrier according to an embodiment of the present invention;

FIG. 10 is a schematic diagram of a method for configuring a central subcarrier according to an embodiment of the present invention;

DETAILED DESCRIPTION

Figure 1:
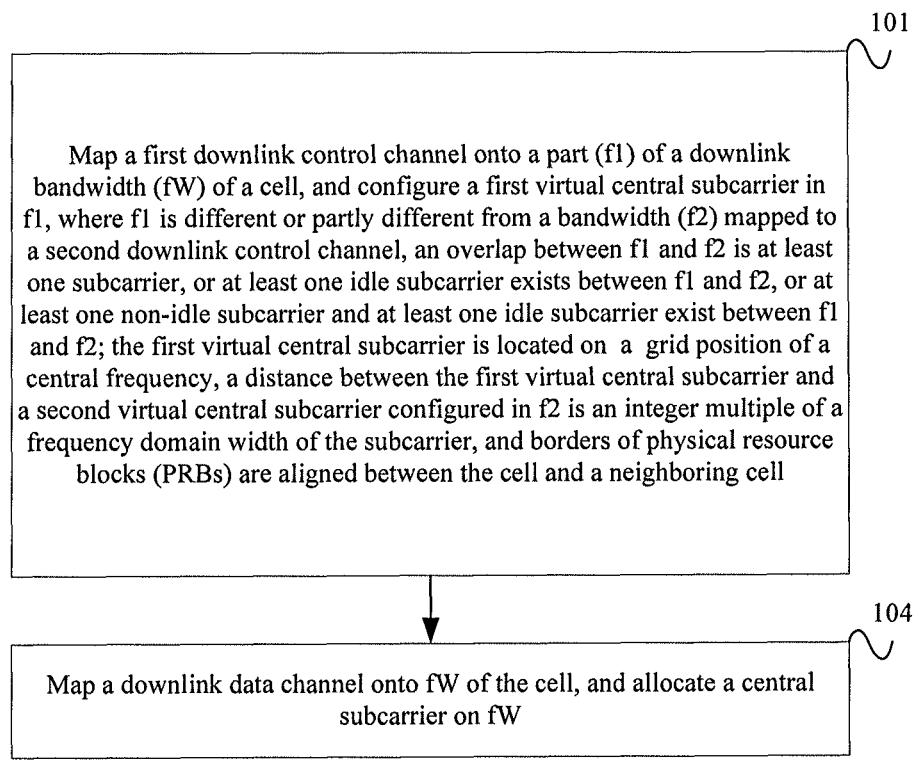
FIG. 1 is a schematic diagram of a method for configuring a central subcarrier according to an embodiment of the present invention.

FIG. 1 is a schematic diagram of a method for configuring a central subcarrier according to an embodiment of the present invention. This embodiment comprises:

Step 101: map a first downlink control channel onto a part f1 of a downlink bandwidth fW of a cell, and configure a first virtual central subcarrier in f1.

f1 is different or partly different from the bandwidth f2 mapped to a second downlink control channel of the cell or a neighboring cell, an overlap between f1 and f2 is at least one subcarrier, or at least one idle subcarrier exists between f1 and f2, or at least one non-idle subcarrier and at least one idle subcarrier exist between f1 and f2;

The first virtual central subcarrier is located on a grid position of a central frequency, a distance between the first virtual central subcarrier and a second virtual central subcarrier configured in f2 is an integer multiple of a frequency domain width of the subcarrier, and borders of physical resource blocks (PRBs) are aligned between the cell and a neighboring cell.

Step 104: map a downlink data channel onto fW of the cell, and configure a central subcarrier on fW.

The entity for executing this embodiment may be a base station. The central subcarrier in this embodiment refers to the subcarrier corresponding to the direct current position of the baseband. The virtual central subcarrier is configured for the existing communication system. The user equipment (UE) of the existing communication system searches for the position of the subcarrier to determine the position of the central subcarrier of the existing communication system (the subcarrier corresponding to the virtual baseband direct current position), and necessary information, for example, frequency range of f1, reference signal position, and so on, is obtained according to the position of the virtual central subcarrier.

In this embodiment, first of all, the base station configures the first virtual central subcarrier on the f1 bandwidth mapped to the first downlink control channel. The virtual central subcarrier is configured for the existing communication system. The user equipment (UE) of the existing communication system searches for the position of the subcarrier to determine the position of the central subcarrier of the existing communication system, and necessary information, for example, frequency range of f1, reference signal position, and so on, is obtained according to the position of the virtual central subcarrier. f1 is different or partly different from f2 mapped to a second virtual subcarrier, an overlap between f1 and f2 is at least one subcarrier, or at least one idle subcarrier exists between f1 and f2, or at least one non-idle subcarrier and at least one idle subcarrier exist between f1 and f2. In a multi-carrier system, f1 and f2 are mapped by the cell; in an orthogonal transmission system of the downlink control channel, f2 is mapped by the neighboring cell, and f1 is mapped by the cell. In this way, the cross-interference of the downlink control channel between the two cells is reduced. The first virtual central subcarrier is located on the grid position of the central frequency. For example, the grid position of the central frequency is an integer multiple of 100 KHz, and the second virtual central subcarrier is also located on the 100 KHz grid. Alternatively, the first virtual central subcarrier (the second virtual central subcarrier) is located on the grid position of the central frequency, the distance between the first virtual central subcarrier and the second virtual central subcarrier is an integer multiple of the grid frequency domain width of the central frequency, and it may be ensured that the second virtual central subcarrier (the first virtual central subcarrier) is located on the grid position of the central frequency. Besides, the distance between the first virtual central subcarrier and the second virtual central subcarrier should be an integer multiple of the frequency domain width of the subcarrier. For example, the frequency domain width of the subcarrier 15 KHz, the distance between the first virtual central subcarrier and the second virtual central subcarrier should also be an integer multiple of 15 KHz, and the borders of physical resource blocks (PRBs) are aligned between the cell and the neighboring cell.

When the grid position of the central frequency is an integer multiple of 100 KHz, and the frequency domain width of the subcarrier is 15 KHz, the foregoing conditions may be expressed by the following formula, supposing that both the first virtual central subcarrier and the second virtual central subcarrier are located on a 100 KHz grid, and the frequency interval between them is D, where D is at least an integer multiple of 300 KHz because D needs to be an integer multiple of 15 KHz and an integer multiple of 100 KHz simultaneously:

$$D = m \times 300 \text{ KHz } (m=1, 2, 3, \ldots).$$

In the formula above, m is a random positive integer. Besides, the borders of physical resource blocks (PRBs) are aligned between the cell and the neighboring cell; it is assumed that between the first virtual central subcarrier and the second virtual central subcarrier, there are n PRBs, a half of the first virtual central subcarrier and a half of the second virtual central subcarrier as well as at least one overlapping subcarrier between f1 and f2, or at least one idle subcarrier between f1 and f2, or at least one non-idle subcarrier and at least one idle subcarrier between f1 and f2, where n is a random positive integer:

$$D = n \times W_{PRB} + W_{SC} + W_\Delta.$$

In the formula above, $W_{PRB}$ is the frequency domain width of the PRB. For example, when a PRB comprises 12 subcarriers, $W_{PRB}$ is 12×15 KHz=180 KHz, $W_{SC}$ is two halves of subcarrier. That is, the frequency domain width of one subcarrier is 15 KHz. $W_\Delta$ is the frequency domain width of at least one overlapping subcarrier between f1 and f2, or at least one idle subcarrier between f1 and f2, or at least one non-idle subcarrier and at least one idle subcarrier between f1 and f2.

The two formulas above can be combined to obtain the frequency interval constraint relationship between the first virtual central subcarrier and the second virtual central subcarrier:

$$n \times W_{PRB} + W_{SC} + W_\Delta = m \times 300 \text{ KHz } (m=1, 2, 3, \ldots).$$

Finally, the base station maps the downlink data channel on the downlink bandwidth fW of the cell, and configures the central subcarrier on fW. The central subcarrier may be configured on the overlapping subcarrier between f1 and f2, or on the subcarrier that is not the overlap between f1 and f2, or on the idle subcarrier between f1 and f2.

This embodiment may further comprise: avoiding scheduling the downlink control channel and/or downlink reference signal such as PCFICH, and/or PHICH, and/or CRS, and/or CSI-RS onto the overlapping subcarrier between f1 and f2, namely, sending the downlink control channel and/or downlink reference signal such as PCFICH, and/or PHICH, and/or CRS, and/or CSI-RS on the subcarriers other than the overlapping subcarrier between f1 and f2.

The virtual subcarrier is configured for the existing communication system. For a user of a new communication system, the subcarrier can still transmit data. Therefore, the subcarrier may be incorporated into a neighboring PRB. Alternatively, the overlapping subcarrier between f1 and f2 may be deleted from the neighboring PRB so that the neighboring PRBs comprise subcarriers other than the overlapping subcarrier between f1 and f2.

When the coverage scope of the cell is less than a first threshold, it is appropriate to increase the bandwidth occupied by data transmission in fW and decrease the protection bandwidth occupied in fW. In this way, the spectrum usage increases without changing fW.

To align the PRB of f1 with the PRB of f2, an idle subcarrier or non-idle subcarrier may be configured on the second virtual central subcarrier of the cell. The idle subcarrier or non-idle subcarrier belongs to the neighboring PRB.

Through the method for configuring central subcarrier in the embodiment of the present invention, the virtual central subcarrier is configured in the case of orthogonal transmission of the downlink control channel or multi-carrier transmission so that the existing communication system works normally.

Figure 2:
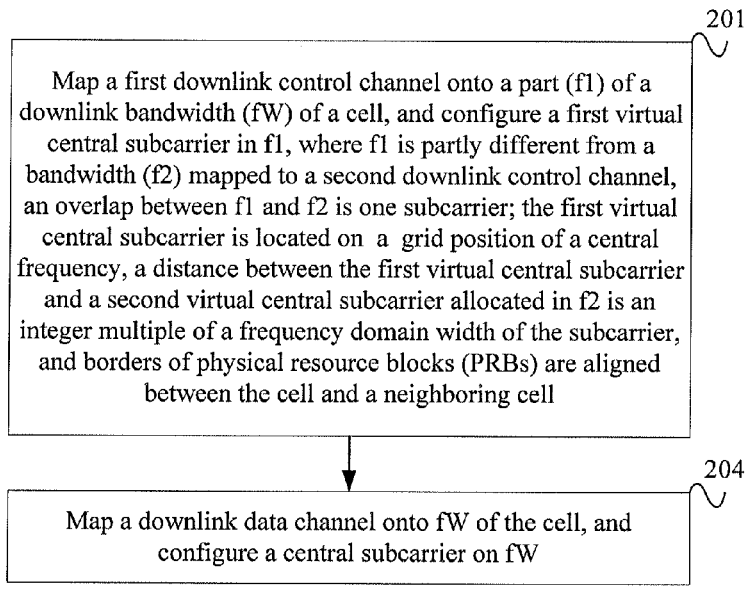
FIG. 2 is a schematic diagram of a method for configuring a central subcarrier according to an embodiment of the present invention.

FIG. 2 is a schematic diagram of a method for configuring a central subcarrier according to an embodiment of the present invention. This embodiment comprises:

Step 201: map a first downlink control channel onto a part f1 of a downlink bandwidth fW of a cell, and configure a first virtual central subcarrier in f1.

f1 is partly different from a bandwidth f2 mapped to a second downlink control channel, and an overlap between f1 and f2 is one subcarrier.

The first virtual central subcarrier is located on a grid position of a central frequency, a distance between the first virtual central subcarrier and a second virtual central subcarrier configured in f2 is an integer multiple of a frequency domain width (15 KHz) of the subcarrier, and borders of physical resource blocks (PRBs) are aligned between the cell and the neighboring cell.

Step 204: map a downlink data channel onto fW of the cell, and configure a central subcarrier on fW.

The entity for executing this embodiment is a base station. This embodiment is a more detailed embodiment than the embodiment shown in FIG. 1.

Figure 3:
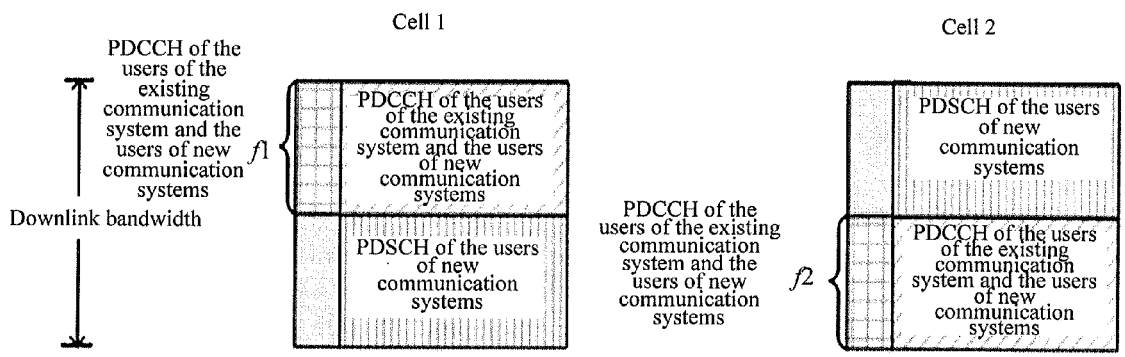
FIG. 3 is a time-frequency resource distribution diagram of a method for configuring a central subcarrier according to an embodiment of the present invention.

It is assumed that the downlink bandwidth fW is 20 MHz, the bandwidth of f1 is 10 MHz, and the PDCCH signals of the users of the existing communication system and the users of new communication systems are transmitted in f1. The PDSCH of the users of the existing communication system falls within the f1 bandwidth, but the PDSCH of the users of new communication systems falls within 20 MHz. The bandwidth of f2 is also 10 MHz, and the PDCCH signals of the users of the existing communication system and the users of new communication systems are transmitted in f2. The PDSCH of the users of the existing communication system falls within the f2 bandwidth, but the PDSCH of the users of new communication systems falls within 20 MHz. It is assumed that in the case of orthogonal transmission of the downlink control channel, the frequency resource distribution diagram is shown in FIG. 3.

According to the frequency interval constraint relationship between the first virtual central subcarrier and the second virtual central subcarrier:

$$n \times W_{PRB} + W_{SC} + W_\Delta = m \times 300 \text{ KHz } (m=1, 2, 3, \ldots),$$

when n=50, m=30 and $W_\Delta$=−15 KHz, the equation above is fulfilled. Therefore, one subcarrier (15 KHz) in the compatible bandwidth of the two cells is an overlapping subcarrier. In this case, the frequency distribution is shown in FIG. 4.

In cell 1, the downlink bandwidth is 20 MHz, which comprises 100 PRBs, and 1 central subcarrier and protection bandwidth; and each PRB comprises 12 subcarriers. fW' is a part for data transmission in the downlink bandwidth, and comprises no protection bandwidth. Therefore, fW' comprises 1201 subcarriers. f1 is the transmission bandwidth compatible with the existing communication system, and comprises 50 PRBs and 1 virtual central subcarrier 1, namely, 601 subcarriers; in cell 2, the downlink bandwidth is 20 MHz. 100 PRBs and 1 central subcarrier are comprised, and each PRB comprises 12 subcarriers. Therefore, the downlink transmission bandwidth comprises 1201 subcarriers. f2 is a transmission bandwidth compatible with the existing communication system, and comprises 50 PRBs and 1 central subcarrier, namely, 601 subcarriers. There is one overlapping subcarrier between f1 and f2.

In cell 1 and cell 2, the base station transmits downlink data at a 20 MHz bandwidth. Their respective central subcarrier a and central subcarrier b are located on the overlapping subcarrier between the two transmission bandwidths of cell 1 and the two transmission bandwidths of cell 2. The protection bandwidths are equal on both sides, and are both (20M−1201*15 K)/2.

Figure 4:
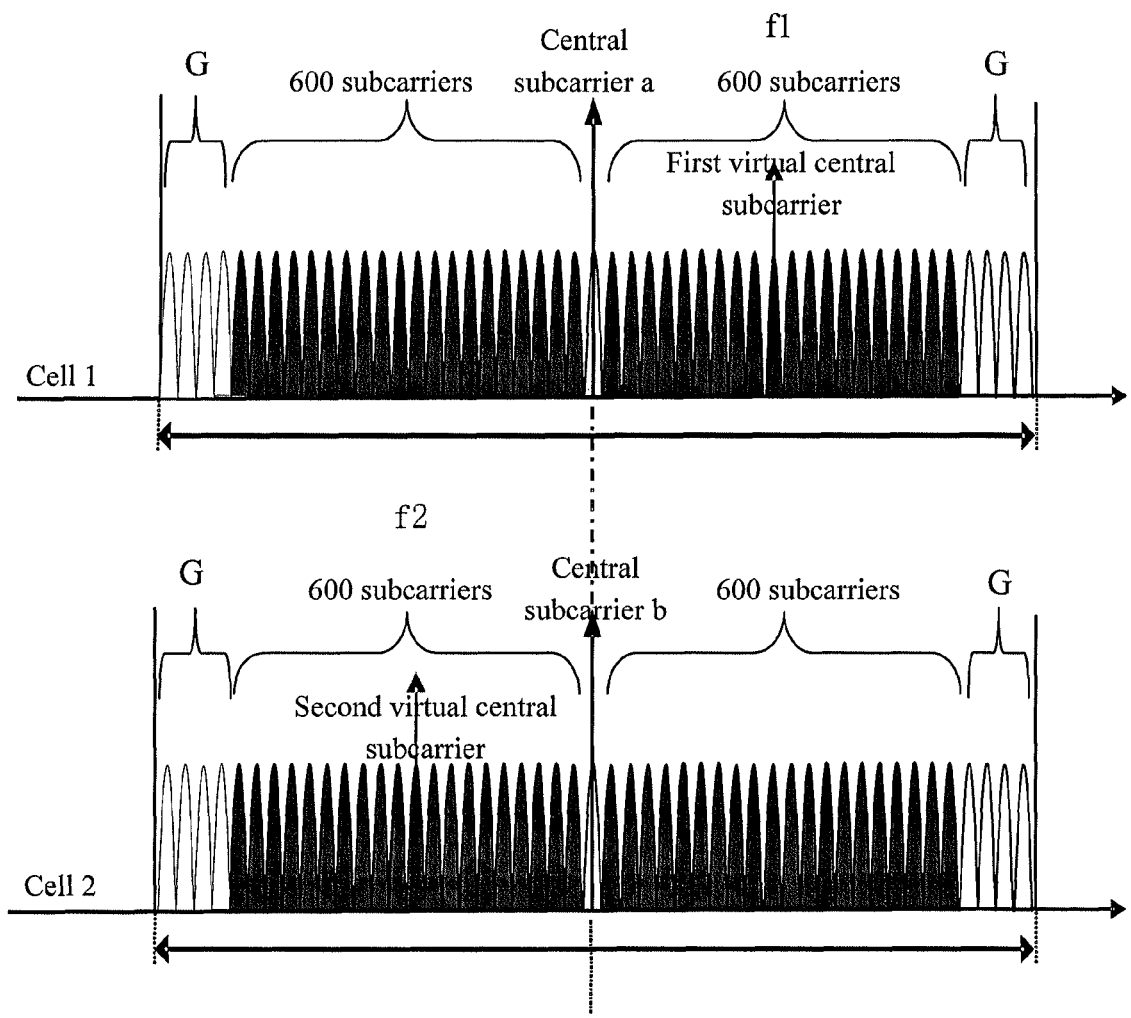
FIG. 4 is a frequency distribution diagram of a method for configuring a central subcarrier according to an embodiment of the present invention.

As shown in FIG. 4, the base station in cell 1 transmits downlink data at a 20 MHz bandwidth, and the central subcarrier a is the intermediate frequency position of fW, and does not transmit any data. The first virtual central subcarrier is the intermediate frequency position of f1, and does not transmit any data to the users of the existing communication system. This subcarrier is a virtual central subcarrier to the users of the existing communication system, and does not transmit any data, but may transmit data or no data to users of new communication systems. f1 is compatible with the users of the existing communication system. In cell 2, the base station transmits downlink data at a 20 MHz bandwidth, and the protection bandwidths are equal on both sides and are both (20 M−1201*15K)/2. The central subcarrier b is the intermediate frequency position of fW of cell 2, and does not transmit any data. The second virtual central subcarrier is the intermediate frequency position of f2. This subcarrier is a virtual central subcarrier to the users of the existing communication system, and does not transmit any data to the users of the existing communication system, but may transmit data or no data to users of new communication systems. f2 is compatible with the users of the existing communication system.

Besides, in order to align the PRB borders of actually mapped data between different cells in the system and facilitate designs such as inter-cell interference coordination and orthogonal reference signals, the PRBs in cell 1 and cell 2 may be defined below:

(1) In cell 1, the PRBs near both sides of the central subcarrier a in fW have only 11 subcarriers on each side. It is avoided that the user data of the existing communication system are scheduled onto the PRB adjacent to the subcarrier located in the central subcarrier a. For the downlink control channel and/or downlink reference signals such as PCFICH, PHICH, CRS, and CSI-RS, measures such as cell identifier planning may be taken to avoid mapping such channels and reference signals onto the subcarrier located in the central subcarrier a.

Figure 5:
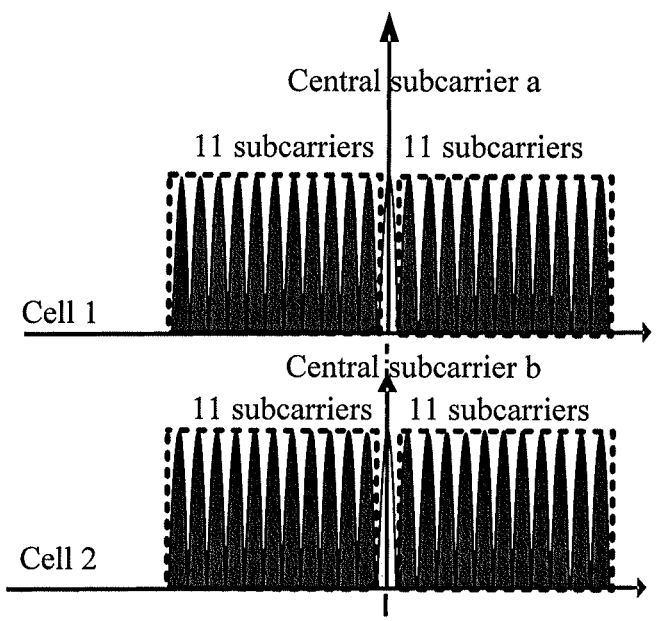
FIG. 5 is a distribution diagram of a part of frequencies of a method for configuring a central subcarrier according to an embodiment of the present invention.

In cell 2, the PRBs near both sides of the central subcarrier b in fW have only 11 subcarriers on each side. It is avoided that the user data of the existing communication system are scheduled onto the PRB adjacent to the subcarrier located in the central subcarrier b. For the downlink control channel and/or downlink reference signals such as PCFICH, PHICH, CRS, and CSI-RS, measures such as cell identifier planning may be taken to avoid mapping such channels and reference signals onto the subcarrier located in the central subcarrier b. In this way, the PRB borders of the two cells are aligned, which facilitates designs such as inter-cell interference coordination and orthogonal reference signals, as shown in FIG. 5.

(2) In cell 1, the first virtual central subcarrier does not transmit any data to users of the existing communication system, but may transmit data or no data to users of new communication systems. Therefore, in cell 1, the PRB on the left side of the first virtual central subcarrier has 12 subcarriers for the users of the existing communication system, and the PRB on the right side of the first virtual central subcarrier also has 12 subcarriers for the users of the existing communication system. To the users of new communication systems, the first virtual central subcarrier may be incorporated into one of the PRBs, and this PRB may have 12 or 13 subcarriers. In cell 2, for a subcarrier located in the same position in the frequency domain as the first virtual central subcarrier, the border of the PRB on the left side and the border of the PRB on the right side of the subcarrier are the same as the counterpart in cell 1.

Figure 6:
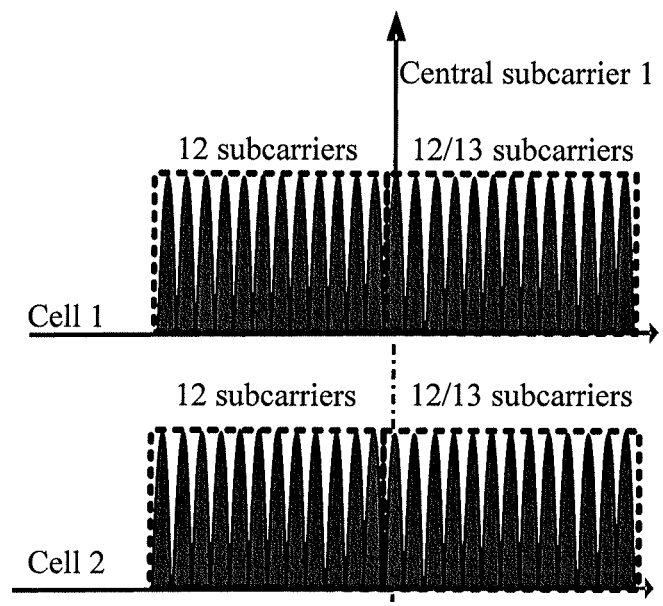
FIG. 6 is a distribution diagram of a part of frequencies of a method for configuring a central subcarrier according to an embodiment of the present invention.

Also, the second virtual central subcarrier does not transmit any data to users of the existing communication system, but may transmit data or no data to users of new communication systems. Therefore, in cell 2, the PRB on the left side of the second virtual central subcarrier has 12 subcarriers for the users of the existing communication system, and the PRB on the right side of the second virtual central subcarrier also has 12 subcarriers for the users of the existing communication system. To the users of new communication systems, the second virtual central subcarrier may be incorporated into one of the PRBs. In cell 1, for a subcarrier located in the same position in the frequency domain as the second virtual central subcarrier, the border of the PRB on the left side and the border of the PRB on the right side of the subcarrier are the same as the counterpart in cell 1. In this way, the PRB borders of the two cells are aligned, which facilitates designs such as inter-cell interference coordination and orthogonal reference signals, as shown in FIG. 6.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally.

Figure 7:
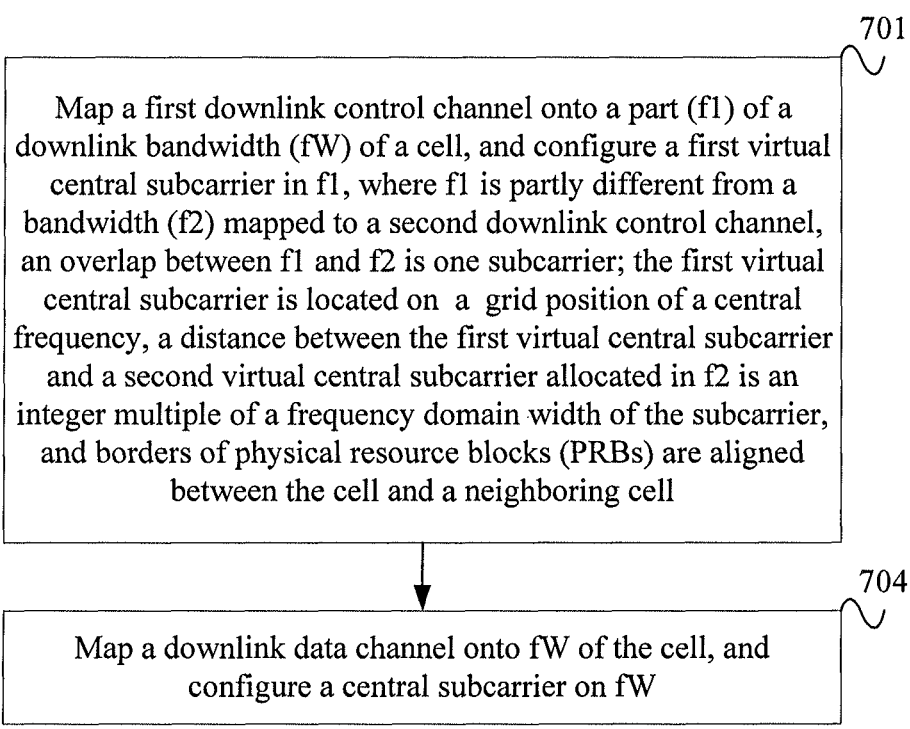
FIG. 7 is a schematic diagram of a method for configuring a central subcarrier according to an embodiment of the present invention.

FIG. 7 is a schematic diagram of a method for configuring a central subcarrier according to an embodiment of the present invention. The method in this embodiment comprises:

Step 701: map a first downlink control channel onto a part f1 of a downlink bandwidth fW of a cell, and configure a first virtual central subcarrier in f1.

f1 is partly different from a bandwidth f2 mapped to a second downlink control channel, and an overlap between f1 and f2 is one subcarrier.

The first virtual central subcarrier is located on a grid position of a central frequency, a distance between the first virtual central subcarrier and a second virtual central subcarrier configured in f2 is an integer multiple of a frequency domain width (15 KHz) of the subcarrier, and borders of physical resource blocks (PRBs) are aligned between the cell and the neighboring cell.

Step 704: map a downlink data channel onto fW of the cell, and configure a central subcarrier on fW.

Figure 8:
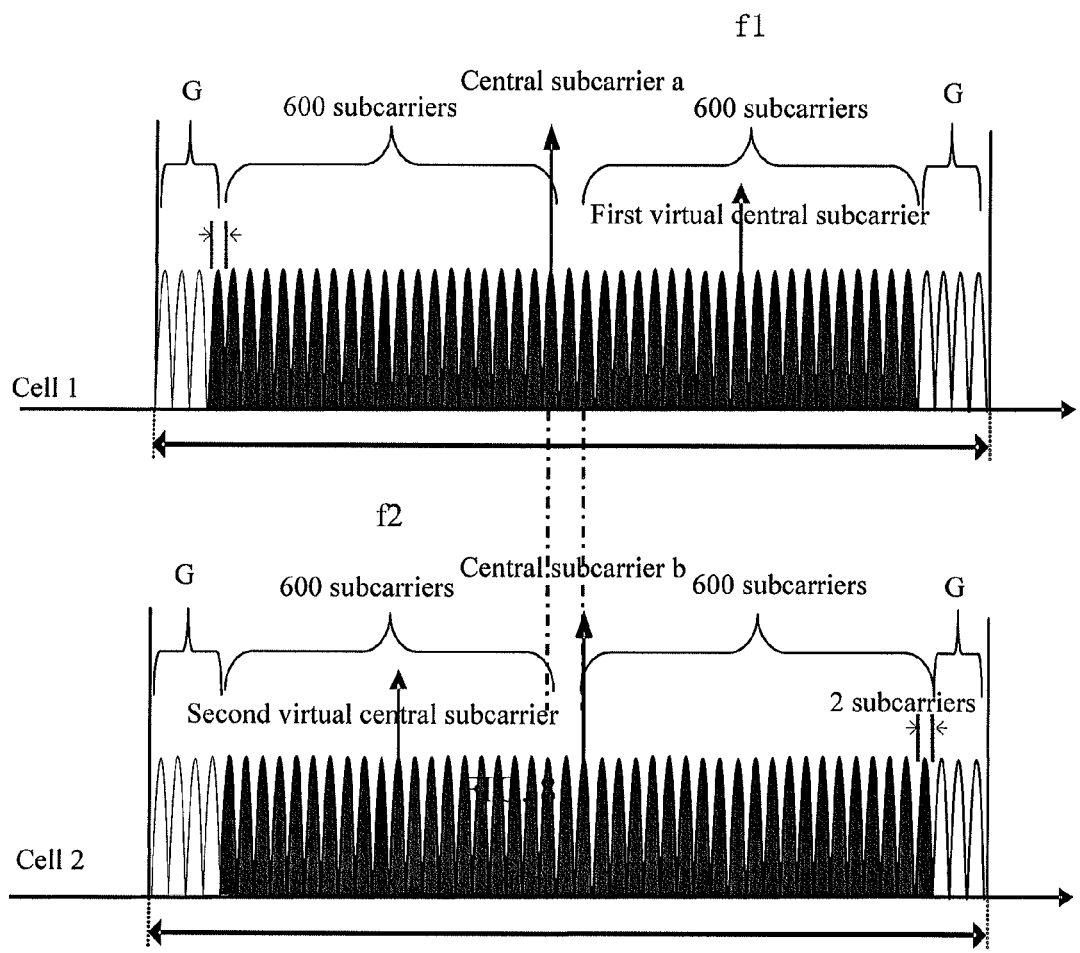
FIG. 8 is a frequency distribution diagram of a method for configuring a central subcarrier according to an embodiment of the present invention.

The entity for executing this embodiment is a base station. This embodiment is a more detailed embodiment than the embodiment shown in FIG. 1. This embodiment differs from the previous embodiment in that: the position of the central subcarrier in the frequency domain of the cell is different from the position of the central subcarrier in the frequency domain of the neighboring cell, as shown in FIG. 8.

In cell 1, the base station transmits downlink data at a 20 MHz bandwidth. The central subcarrier a is the frequency domain position of the central subcarrier of cell 1, and this position is adjacent to the edge subcarrier of f1, and transmits no data. The first virtual central subcarrier is the intermediate frequency position of f1. This subcarrier is a virtual central subcarrier to the users of the existing communication system, and does not transmit any data to the users of the existing communication system, but may transmit data or no data to users of new communication systems. f1 is compatible with the users of the existing communication system. In cell 2, the base station transmits downlink data at a 20 MHz bandwidth. The central subcarrier b is the frequency domain position of the central subcarrier of cell 2, and this position is adjacent to the edge subcarrier of f2, and transmits no data. The second virtual central subcarrier is the intermediate frequency position of f2, and does not transmit any data to the users of the existing communication system. This subcarrier is a virtual central subcarrier to the users of the existing communication system, and may transmit data or no data to users of new communication systems. f2 is compatible with the users of the existing communication system.

The central subcarrier a in cell 1 is located on the subcarrier adjacent to the edge subcarrier of f1. If the number of data subcarriers in the downlink bandwidth keeps unchanged, the subcarriers in the protection bandwidth on one side of the downlink bandwidth are used to map data, which makes the protection bandwidth unequal between both sides. Similarly, the central subcarrier b in cell 2 is located on the subcarrier adjacent to the edge subcarrier of f2, and, if the number of data subcarriers in the downlink bandwidth keeps unchanged, the subcarriers in the protection bandwidth on one side of the downlink bandwidth are used to map data, which makes the protection bandwidth unequal between both sides.

Besides, in order to align the PRB borders of actually mapped data between different cells in the system and facilitate designs such as inter-cell interference coordination and orthogonal reference signals, the PRBs in cell 1 and cell 2 may be defined below:

(1) In cell 1, on the f1 side (the right side) of the central subcarrier a, a position of a subcarrier corresponds to a subcarrier position in cell 2, which is used as the position of the central frequency fW of cell 2. To avoid interference to the subcarrier b of the central frequency of f2 of cell 2, this subcarrier may transmit no data. Meanwhile, one subcarrier on this side overlaps one edge subcarrier of f2 in cell 2. To avoid interference between cell 1 and cell 2 in this subcarrier position, this subcarrier may transmit data or no data. Therefore, this PRB may have 11 or 12 subcarriers. It is avoided that the user data of the existing communication system is scheduled onto this PRB. For the downlink control channel and/or downlink reference signals such as PCFICH, PHICH, CRS, and CSI-RS, measures such as cell identifier planning may be taken to avoid mapping such channels and reference signals onto the counterpart subcarrier of the central subcarrier a corresponding to fW of cell 1. To ensure alignment with the border of the PRB of cell 2, the PRB on the other side of the central subcarrier a comprises 10 subcarriers, as shown in FIG. 9.

In cell 2, on the side near the central subcarrier b or on the side (right side) of fW, one subcarrier is used as a central subcarrier b for transmitting link data. Therefore, the subcarrier located in the central subcarrier b in the PRB transmits no data. On the fW side or on the other side (left side) of the central subcarrier b, a position of a subcarrier corresponds to a subcarrier position in cell 1, which serves as a position of a central frequency of fW of cell 1. To avoid interference to the subcarrier of the central frequency of f1 in cell 1, this subcarrier may transmit no data. This PRB may have 10 or 11 subcarriers, as shown in FIG. 9. It is avoided that the user data of the existing communication system is scheduled onto this PRB. For the downlink control channel and/or reference signals such as PCFICH, PHICH, CRS, and CSI-RS, measures such as cell identifier planning may be taken to avoid mapping such channels and reference signals onto the counterpart subcarrier of the central subcarrier b corresponding to fW in cell 2.

In this way, the PRB borders of the two cells are aligned, which facilitates designs such as inter-cell interference coordination and orthogonal reference signals.

(2) In cell 1, the first virtual central subcarrier in f1 does not transmit any data to users of the existing communication system, but may transmit data or no data to users of new communication systems. Therefore, in cell 1, the PRB on the left side of the first virtual central subcarrier has 12 subcarriers for the users of the existing communication system, and the PRB on the right side of the first virtual central subcarrier also has 12 subcarriers for the users of the existing communication system. For the users of new communication systems, one of the PRBs may have 12 or 13 subcarriers.

In cell 2, for a subcarrier located in the same position in the frequency domain as the first virtual central subcarrier in f1 in cell 1, either the PRB on the left side or the PRB on the right side of the subcarrier may have 12 or 13 subcarriers; and, in the same frequency domain position as that in cell 1, the PRB configuration is the same.

Similarly, in cell 2, the second virtual central subcarrier in f2 does not transmit any data to users of the existing communication system, but may transmit data or no data to users of the new communication system. Therefore, in cell 2, the PRB on the left side of the second virtual central subcarrier has 12 subcarriers for the users of the existing communication system, and the PRB on the right side of the second virtual central subcarrier also has 12 subcarriers for the users of the existing communication system. For users of new communication systems, one of the PRBs may have 12 or 13 subcarriers. In cell 1, for a subcarrier located in the same position in the frequency domain as the second virtual central subcarrier in f2 in cell 2, either the PRB on the left side or the PRB on the right side of the subcarrier may have 12 or 13 subcarriers; and, in the same frequency domain position as that in cell 2, the PRB configuration is the same, as shown in FIG. 6.

In this way, the PRB borders of the two cells are aligned, which facilitates designs such as inter-cell interference coordination and orthogonal reference signals.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally.

FIG. 10 is a schematic diagram of a method for configuring a central subcarrier according to an embodiment of the present invention. The method in this embodiment comprises:

Step 1001: map a first downlink control channel onto a part f1 of a downlink bandwidth fW of a cell, and configure a first virtual central subcarrier in f1.

f1 is different from a bandwidth f2 mapped to a second downlink control channel, at least one idle subcarrier exists between f1 and f2, or at least one non-idle subcarrier and at least one idle subcarrier exist between f1 and f2.

The first virtual central subcarrier is located on a grid position of a central frequency, and a distance between the first virtual central subcarrier and a second virtual central subcarrier configured in f2 is an integer multiple of a frequency domain width (15 KHz) of the subcarrier.

Step 1004: map a downlink data channel onto fW of the cell, and configure a central subcarrier on fW.

The entity for executing this embodiment is a base station. This embodiment is a more detailed embodiment than the embodiment shown in FIG. 1.

Figure 11:
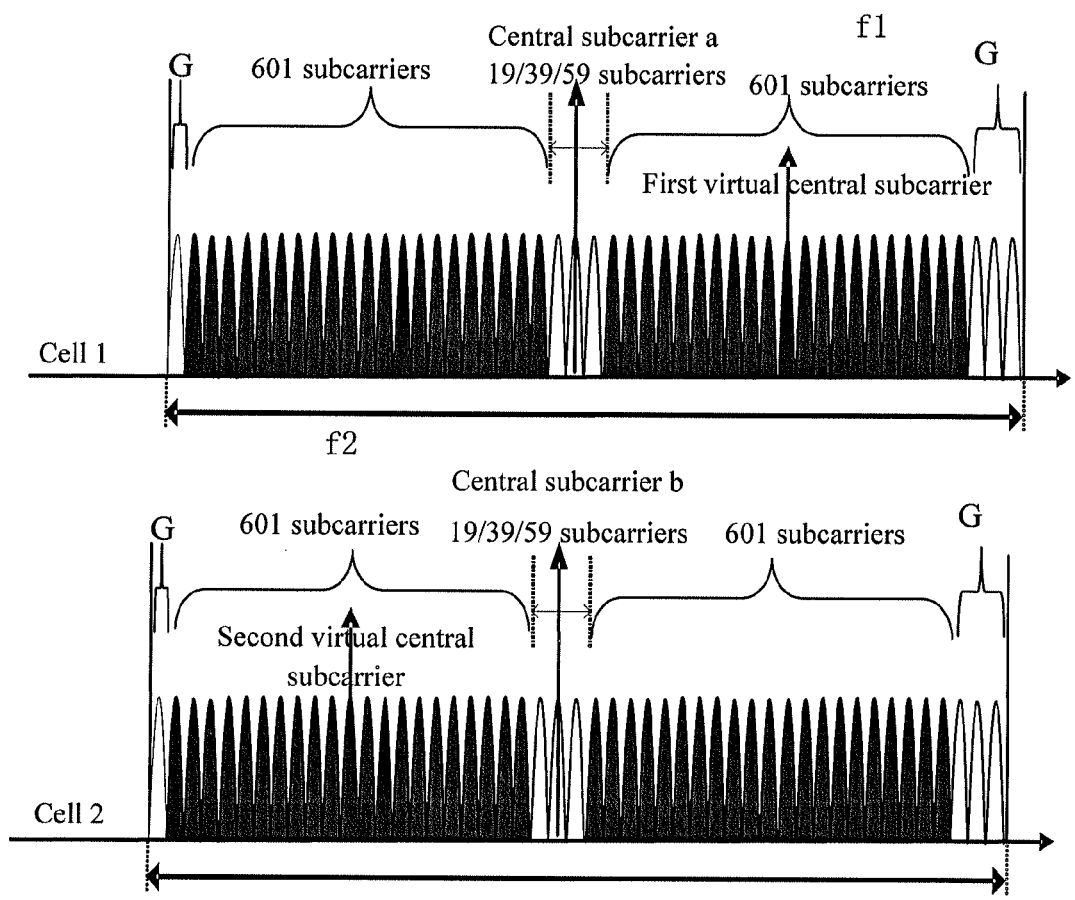
FIG. 11 is a frequency distribution diagram of a method for configuring a central subcarrier according to an embodiment of the present invention.

When the downlink control channel performs orthogonal transmission, it is assumed that: both cells transmit data at fW, the downlink bandwidth is 20 MHz, and the bandwidth of f1 in cell 1 is 10 MHz. Then, the PDCCH signals of the users of the existing communication system and the users of new communication systems are transmitted in f1. The PDSCH of the users of the existing communication system falls within the f1 bandwidth, but the PDSCH of the users of new communication systems falls within the entire downlink bandwidth 20 MHz. In cell 2, the bandwidth of f2 is 10 MHz, and the PDCCH signals of the users of the existing communication system and the users of new communication systems are transmitted in f2. The PDSCH of the users of the existing communication system falls within the f2 bandwidth, but the PDSCH of the users of new communication systems falls within the entire downlink bandwidth 20 MHz. The frequency resource distribution is shown in FIG. 11.

According to the frequency interval constraint relationship between the first virtual central subcarrier and the second virtual central subcarrier:

$$n \times W_{PRB} + W_{SC} + W_A = m \times 300 \text{ KHz } (m=1, 2, 3, \dots).$$

Therefore, when n=50, if m=31, $W_A$=285 KHz=19*$W_{SC}$; if m=32, $W_A$=300 KHz+285 KHz=39*$W_{SC}$, which fulfills the foregoing equation. That is to say, 19 or 39 subcarriers (15 KHz) need to be inserted between the transmission bandwidths of the bandwidth compatible with the two cells.

In cell 1, the downlink bandwidth is 20 MHz, including 100 PRBs, 1 central subcarrier, n×20−1 (n=1, 2, . . . ) inserted subcarriers, and protection bandwidth. fW' is a part for data transmission in the downlink bandwidth, and comprises no protection bandwidth.

Therefore, fW' comprises 1201+n×20−1 (n=1, 2, . . . ) subcarriers. f1 compromises 50 PRBs and 1 virtual center subcarrier, namely, 601 subcarriers. The base station transmits downlink data at a 20 MHz bandwidth. The central subcarrier a is a subcarrier in fW and located outside f1, and transmits no data. The first virtual central subcarrier is the intermediate frequency position of f1, and does not transmit any data to the users of the existing communication system, (this subcarrier is a virtual central subcarrier to the users of the existing communication system) and may transmit data or no data to users of new communication systems. f1 is compatible with the users of the existing communication system.

In cell 2, the downlink bandwidth is 20 MHz, including 100 PRBs, 1 central subcarrier, and n×20−1 (n=1, 2, . . . ) inserted subcarriers. fW' is a part for data transmission in the downlink bandwidth, and comprises no protection bandwidth. Therefore, fW' comprises 1201+n×20−1 (n=1, 2, . . . ) subcarriers, and f2 comprises 50 PRBs and 1 virtual center subcarrier, namely, 601 subcarriers. The base station transmits downlink data at a 20 MHz bandwidth. The central subcarrier b is a subcarrier in fW and located outside f2, and transmits no data. The second virtual central subcarrier is the intermediate frequency position of f2, and does not transmit any data to the users of the existing communication system, (this subcarrier is a virtual central subcarrier to the users of the existing communication system) and may transmit data or no data to users of new communication systems. f2 is compatible with the users of the existing communication system.

The central subcarrier a in cell 1 is located in n×20−1 (n=1, 2, . . . ) idle subcarriers. Such idle subcarriers may reduce the protection bandwidth on one side of the downlink bandwidth (in the case that n is an odd number), and make the protection bandwidth unequal between both sides. Similarly, the central subcarrier b in cell 2 is located in n×20−1 (n=1, 2, . . . ) idle subcarriers. Such inserted idle subcarriers may reduce the protection bandwidth on one side of the downlink bandwidth (in the case that n is an odd number), and make the protection bandwidth unequal between both sides.

Besides, in order to align the PRB borders of actually mapped data between different cells in the system and facilitate designs such as inter-cell interference coordination and orthogonal reference signals, the PRBs in cell 1 and cell 2 may be defined below:

In cell 1, the first virtual central subcarrier in f1 does not transmit any data to users of the existing communication system, but may transmit data or no data to users of new communication systems. Therefore, in cell 1, the PRB on the left side of the first virtual central subcarrier has 12 subcarriers for the users of the existing communication system, and the PRB on the right side of the first virtual central subcarrier also has 12 subcarriers for the users of the existing communication system. For the users of new communication systems, one of the PRBs may have 12 or 13 subcarriers.

In cell 2, for a subcarrier located in the same position in the frequency domain as the first virtual central subcarrier, either the PRB on the left side or the PRB on the right side of the subcarrier may have 12 or 13 subcarriers; and, in the same frequency domain position as that in cell 1, the PRB configuration is the same.

Similarly, in cell 2, the second virtual central subcarrier in f2 does not transmit any data to users of the existing communication system, but may transmit data or no data to users of the existing communication system. Therefore, in cell 2, the PRB on the left side of the second virtual central subcarrier has 12 subcarriers for the users of the existing communication system, and the PRB on the right side of the second virtual central subcarrier also has 12 subcarriers for the users of the existing communication system. For the users of new communication systems, one of the PRBs may have 12 or 13 subcarriers. In cell 1, for a subcarrier located in the same position in the frequency domain as the second virtual central subcarrier, either the PRB on the left side or the PRB on the right side of this subcarrier may have 12 or 13 subcarriers; and, in the same frequency domain position as that in cell 2, the PRB configuration is the same.

In this way, the PRB borders of the two cells are aligned, which facilitates designs such as inter-cell interference coordination and orthogonal reference signals.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally.

Figure 12:
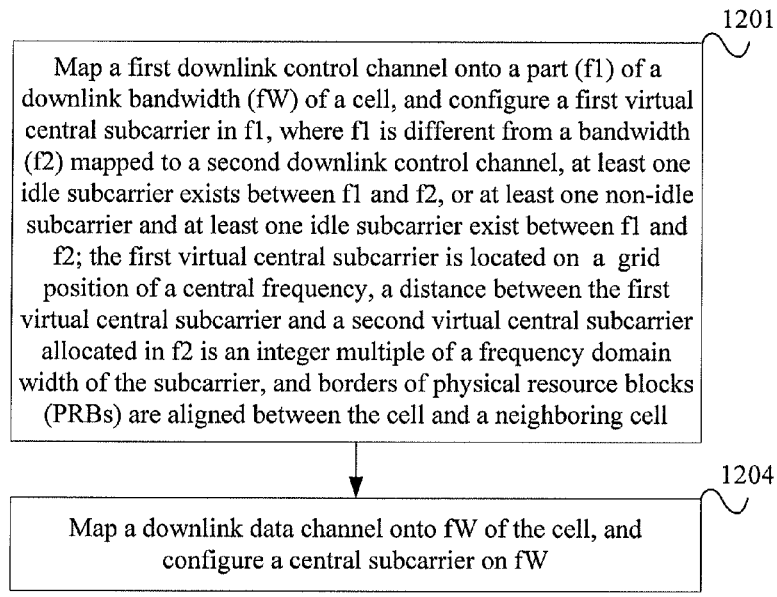
FIG. 12 is a schematic diagram of a method for configuring a central subcarrier according to an embodiment of the present invention.

FIG. 12 is a schematic diagram of a method for configuring a central subcarrier according to an embodiment of the present invention. The method in this embodiment comprises:

Step 1201: map a first downlink control channel onto a part f1 of a downlink bandwidth fW of a cell, and configure a first virtual central subcarrier in f1.

f1 is different from a bandwidth f2 mapped to a second downlink control channel, at least one idle subcarrier exists between f1 and f2, or at least one non-idle subcarrier and at least one idle subcarrier exist between f1 and f2.

The first virtual central subcarrier is located on a grid position of a central frequency, a distance between the first virtual central subcarrier and a second virtual central subcarrier configured in f2 is an integer multiple of a frequency domain width (15 KHz) of the subcarrier, and borders of physical resource blocks (PRBs) are aligned between the cell and the neighboring cell.

Step 1204: map a downlink data channel onto fW of the cell, and configure a central subcarrier on fW.

Figure 13:
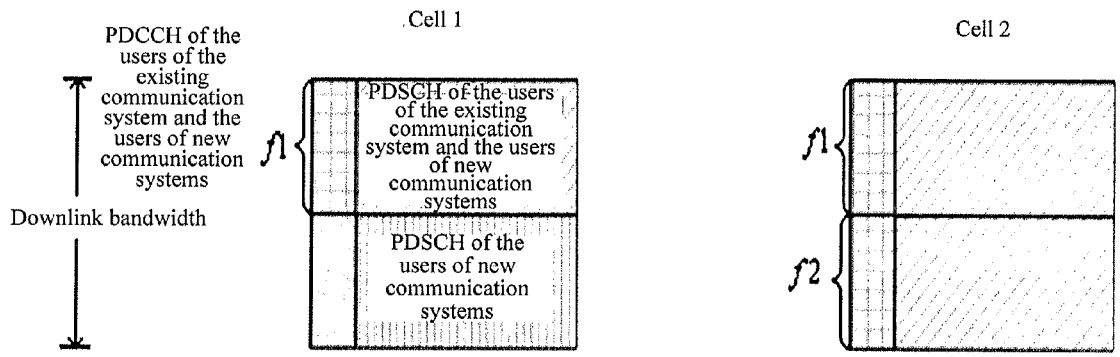
FIG. 13 is a time-frequency resource distribution diagram of a method for configuring a central subcarrier according to an embodiment of the present invention.
Figure 14:
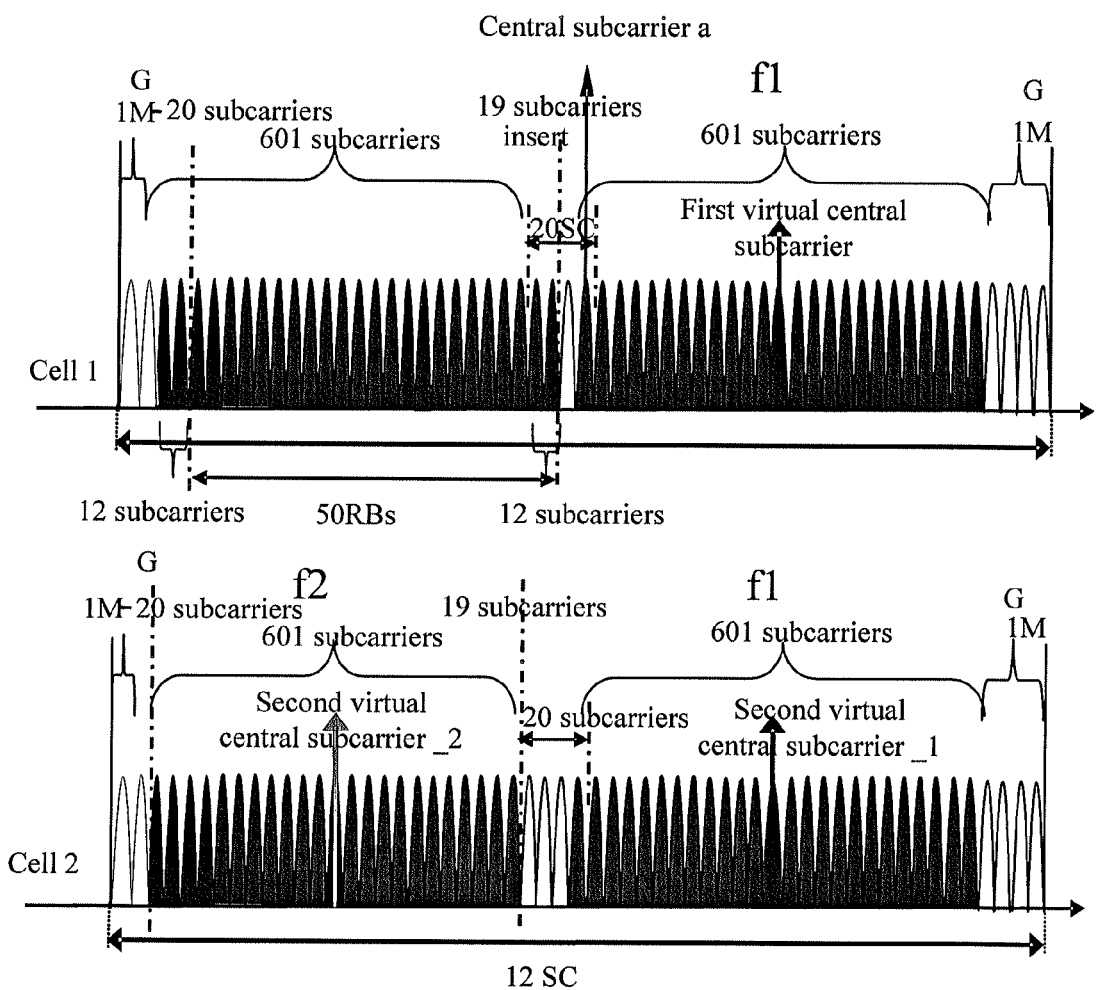
FIG. 14 is a frequency distribution diagram of a method for configuring a central subcarrier according to an embodiment of the present invention.

This embodiment differs from the previous embodiment in that: the neighboring cell may map the second downlink control channel onto f1, and does not map the second downlink control channel onto f2 unless in specific conditions. For example, for the user equipment (UE) far away from the base station in the cell, the second downlink control channel is mapped to f2; for the UE near the base station in the cell, the second downlink control channel is mapped to f1. The time-frequency resources in this embodiment are shown in FIG. 13. The frequency domain position of the central subcarrier of the cell varies between this embodiment and the previous embodiment, as shown in FIG. 14.

Similar to the previous embodiment, it is assumed that the downlink bandwidth is 20 MHz, the bandwidth of f1 in cell 1 is 10 MHz, and the PDCCH signals of the users of the existing communication system and the users of new communication systems are transmitted in f1. The PDSCH of the users of the existing communication system falls within the f1 bandwidth, but the PDSCH of the users of new communication systems falls within the entire downlink bandwidth 20 MHz. In cell 2, the bandwidth of f1 is 10 MHz, the bandwidth of f2 is also 10 MHz, f1 and/or f2 provides a bandwidth for transmitting the PDCCH signals of the users of the existing communication system and the users of new communication systems, and the transmit power of the PDCCH may be 0. The bandwidth of the PDSCH of the users of the existing communication system corresponds to the bandwidth of the PDCCH, and the PDSCH of the users of new communication systems falls within the entire downlink bandwidth.

In cell 1, the downlink bandwidth is 20 MHz, including 100 PRBs, 1 central subcarrier, n×20−1 (n=1, 2, . . . ) inserted subcarriers, and protection bandwidth. fW' is a part for data transmission in the downlink bandwidth, comprises no protection bandwidth, and comprises 1201+n×20−1 (n=1, 2, . . . ) subcarriers. f1 comprises 50 PRBs and 1 center subcarrier, namely, 601 subcarriers. The base station transmits downlink data at a 20 MHz bandwidth. The central subcarrier a is a subcarrier in fW and located on the edge subcarrier of f1, and does not transmit any data. It is avoided that the user data of the existing communication system are scheduled onto the PRB adjacent to the subcarrier located in the central subcarrier a. For the downlink control channel and/or reference signals such as PCFICH, PHICH, CRS, and CSI-RS, measures such as cell identifier planning may be taken to avoid mapping such channels and reference signals onto the subcarrier located in the central subcarrier a.

The first virtual central subcarrier is the intermediate frequency position of f1, and does not transmit any data to the users of the existing communication system, (this subcarrier is a virtual central subcarrier to the users of the existing communication system) and may transmit data or no data to users of new communication systems. f1 is compatible with the users of the existing communication system.

In cell 2, the downlink bandwidth is 20 MHz. The transmission bandwidth comprises f1 and f2. The base station may transmit downlink data at a 10 MHz bandwidth within the f1 band range by using the second virtual central subcarrier _1 as a central subcarrier, and transmit downlink data at a 10 MHz bandwidth within the f2 band range by using the second virtual central subcarrier _2 as a central subcarrier, respectively.

To enable the users of the existing communication system to hand over between cell 1 and cell 2, the first virtual central subcarrier and "the second virtual central subcarrier _1 and/or the second virtual central subcarrier _2" need to be located on a 100 KHz channel grid (it is assumed hereinafter that the first virtual central subcarrier, the second virtual central subcarrier _1, and the second virtual central subcarrier _2 are located on such channel grid). Therefore, the mutual interval between the first virtual central subcarrier, and the second virtual central subcarrier _1, and the second virtual central subcarrier _2 is an integer multiple of 100 KHz. As shown in FIG. 14, the central subcarrier a in cell 1 is located on an overlapping subcarrier between the two transmission bandwidths of cell 1 and the two transmission bandwidths of cell 2, and within the inserted n×20−1 (n=1, 2, . . . ) idle subcarriers. Such inserted idle subcarriers reduce the protection bandwidth on one side of the downlink bandwidth. Similarly, n×20−1 (n=1, 2, . . . ) idle subcarriers are inserted in a position of a subcarrier in cell 2, where the position of the subcarrier corresponds to the central subcarrier a in cell 1.

Figure 15:
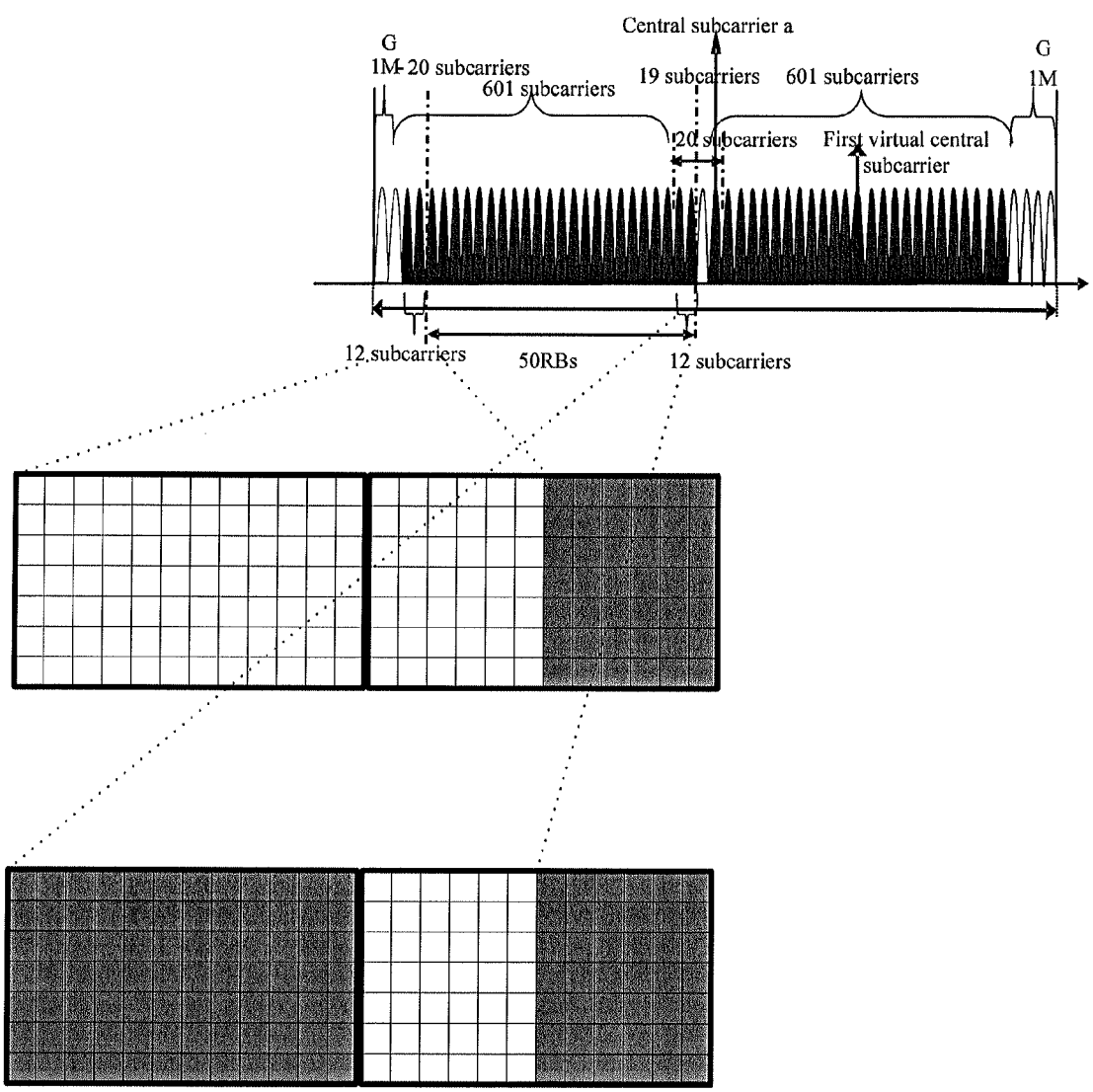
FIG. 15 is a frequency distribution diagram of a method for configuring a central subcarrier according to an embodiment of the present invention.

In cell 1, the base station transmits data at a 20 MHz bandwidth. If a 20 MHz protection bandwidth keeps unchanged, a part of subcarriers of fW' in the cell will overlap a part of subcarriers of the protection bandwidth, and will be unable to transmit data. Part or all of the inserted n×20−1 (n=1, 2, . . . ) idle subcarriers may be used to transmit data. Specifically, in fW in cell 1, the sequence numbers of the PRBs of the subcarriers that overlap some subcarriers of the protection bandwidth may be mapped onto some subcarriers in the inserted n×20−1 (n=1, 2, . . . ) idle subcarriers. In this way, the system resource usage is improved, as shown in FIG. 15.

In cell 2, the downlink bandwidth is 20 MHz. The transmission bandwidth comprises f1 and f2. The base station may transmit downlink data at a 10 MHz bandwidth within the f1 band range by using the second virtual central subcarrier _1 as a central subcarrier, and transmit downlink data at a 10 MHz bandwidth within the f2 band range by using the second virtual central subcarrier _2 as a central subcarrier, respectively. The transmitting protection bandwidth is the same as the protection bandwidth corresponding to 10 MHz, namely, (10 MHz−(NRB+1)*15 KHz)/2. The cross interference between multiple transmitting links is acceptable only if the carrier synchronization deviation is tiny between cells and between multiple transmitters.

Besides, in order to align the PRB borders of actually mapped data between different cells in the system and facilitate designs such as inter-cell interference coordination and orthogonal reference signals, the position of the second virtual central subcarrier _1 in f1 in cell 2 coincides with the position of the first virtual central subcarrier in f1 in cell 1. The subcarrier in cell 1, which corresponds to the second virtual central subcarrier _2 in f2 in cell 2, does not transmit any data to users of the existing communication system, and may transmit data or no data to users of new communication systems. Therefore, for a subcarrier located in cell 1 and corresponding to the second virtual central subcarrier _1 in cell 2, the PRB on the left side of this subcarrier has 12 subcarriers for the users of the existing communication system, and the PRB on the right side of this subcarrier also has 12 subcarriers for the users of the existing communication system. For the users of new communication systems, one of the PRBs may have 12 or 13 subcarriers. The PRB borders of the first virtual central subcarriers are aligned between the two cells, which facilitates designs such as inter-cell interference coordination and orthogonal reference signals.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally.

Figure 16:
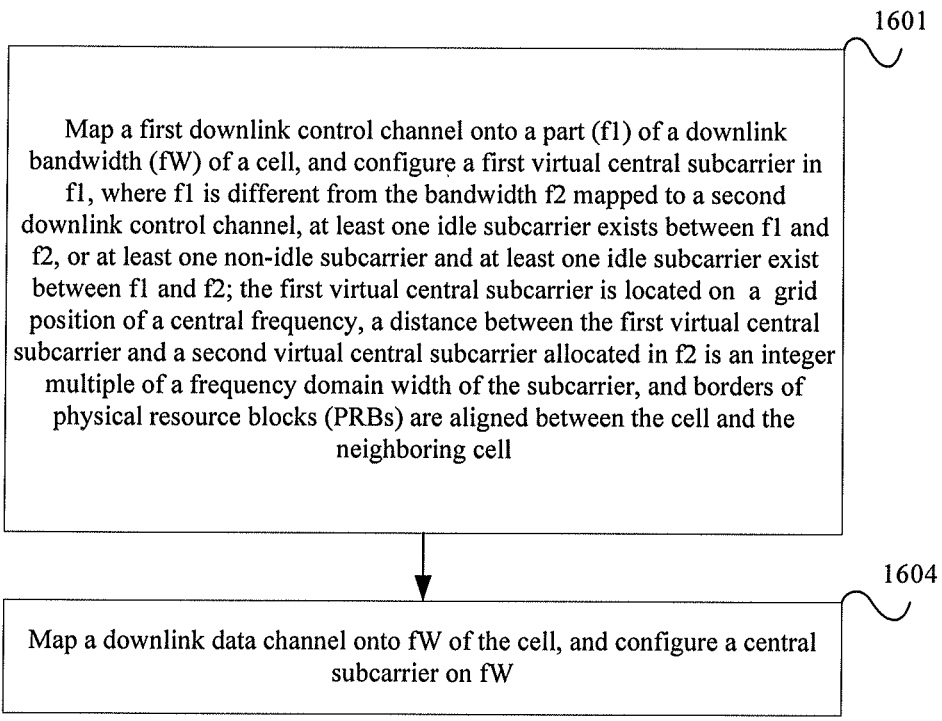
FIG. 16 is a schematic diagram of a method for configuring a central subcarrier according to an embodiment of the present invention.

FIG. 16 is a schematic diagram of a method for configuring a central subcarrier according to an embodiment of the present invention. The method in this embodiment comprises:

Step 1601: map a first downlink control channel onto a part f1 of a downlink bandwidth fW of a cell, and configure a first virtual central subcarrier in f1.

f1 is different from a bandwidth f2 mapped to a second downlink control channel, at least one idle subcarrier exists between f1 and f2, or at least one non-idle subcarrier and at least one idle subcarrier exist between f1 and f2.

The first virtual central subcarrier is located on a grid position of a central frequency, a distance between the first virtual central subcarrier and a second virtual central subcarrier configured in f2 is an integer multiple of a frequency domain width (15 KHz) of the subcarrier, and borders of physical resource blocks (PRBs) are aligned between the cell and the neighboring cell.

Step 1604: map a downlink data channel onto fW of the cell, and configure a central subcarrier on fW.

Figure 17:
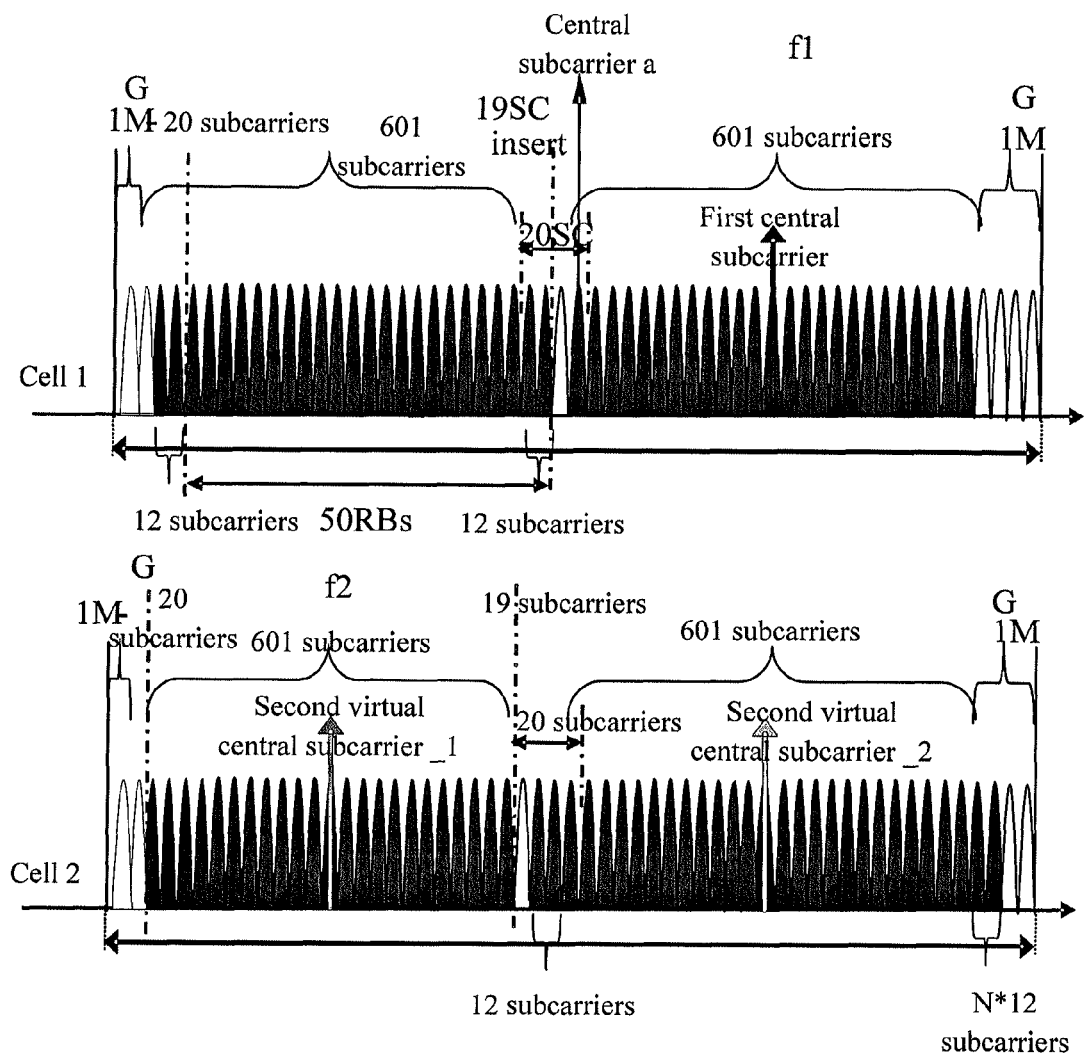
FIG. 17 is a frequency distribution diagram of a method for configuring a central subcarrier according to an embodiment of the present invention.

This embodiment differs from the previous embodiment in the processing in cell 2, as shown in FIG. 17.

To ensure an interval equivalent to an integer multiple of 100 KHz between the first virtual central subcarrier of cell 1, and the second virtual central subcarrier _1 of cell 2, and the second virtual central subcarrier _2 of cell 2, and, to ensure that the first virtual central subcarrier of cell 1, the second virtual central subcarrier _1 and the second virtual central subcarrier _2 of cell 2 are located on a 100 KHz grid, n×20−1 (n=1, 2, ... ) idle subcarriers are inserted into the subcarrier position in cell 2 that corresponds to the central subcarrier a. In cell 2, the inserted idle subcarriers may be used to transmit data. Besides, in order to align the PRB borders of actually mapped data between different cells in the system and facilitate designs such as inter-cell interference coordination and orthogonal reference signals, the position of the second virtual central subcarrier _1 in f1 in cell 2 coincides with the position of the first virtual central subcarrier in f1 in cell 1. The subcarrier in cell 1, which corresponds to the second virtual central subcarrier _2 in f2 in cell 2, does not transmit any data to users of the existing communication system, and may transmit data or no data to users of new communication systems. Therefore, for a subcarrier located in cell 1 and corresponding to the second virtual central subcarrier _1 in f1 in cell 2, the PRB on the left side of this subcarrier has 12 subcarriers for the users of the existing communication system, and the PRB on the right side of this subcarrier also has 12 subcarriers for the users of the existing communication system. For the users of new communication systems, one of the PRBs may have 12 or 13 subcarriers.

The position of the second virtual central subcarrier _1 in f1 in cell 2 is the same as the position of the first virtual central subcarrier in f1 in cell 1. Some subcarriers in f1 in cell 2 overlap the subcarriers in the protection bandwidth of cell 1, and such subcarriers are outside the protection bandwidth of the transmitter corresponding to f1 in cell 2. Such subcarriers may be used to transmit data. Similarly, some subcarriers in f2 in cell 2 overlap the subcarriers in the protection bandwidth of cell 1, and such subcarriers are outside the protection bandwidth of the transmitter corresponding to f2 in cell 2. Such subcarriers may be used to transmit data.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally. In this way, the system resource usage is further improved.

Figure 18:
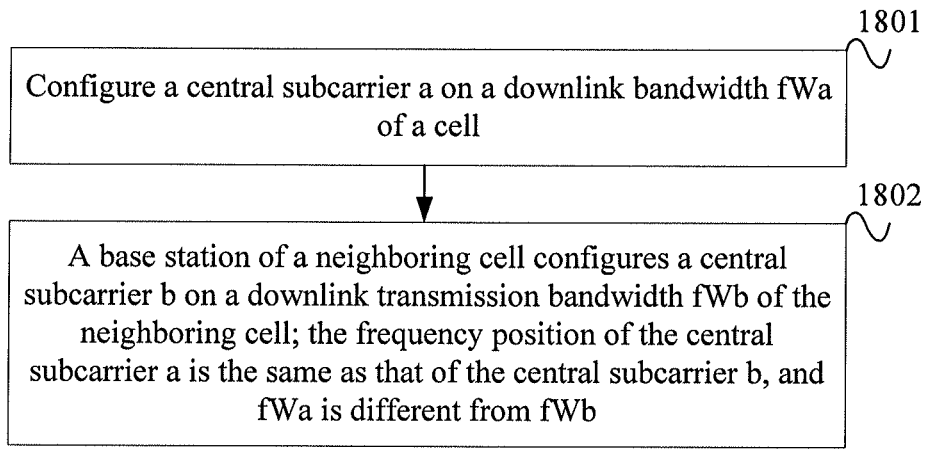
FIG. 18 is a schematic diagram of a method for configuring a central subcarrier according to an embodiment of the present invention.

FIG. 18 is a schematic diagram of a method for configuring a central subcarrier according to an embodiment of the present invention. The method in this embodiment comprises:

Step 1801: configure a central subcarrier a on a downlink bandwidth fWa of a cell.

Step 1802: a base station of a neighboring cell configures a central subcarrier b on a downlink transmission bandwidth fWb of the neighboring cell; the frequency position of the central subcarrier a is the same as that of the central subcarrier b, and fWa is different from fWb.

Figure 19:
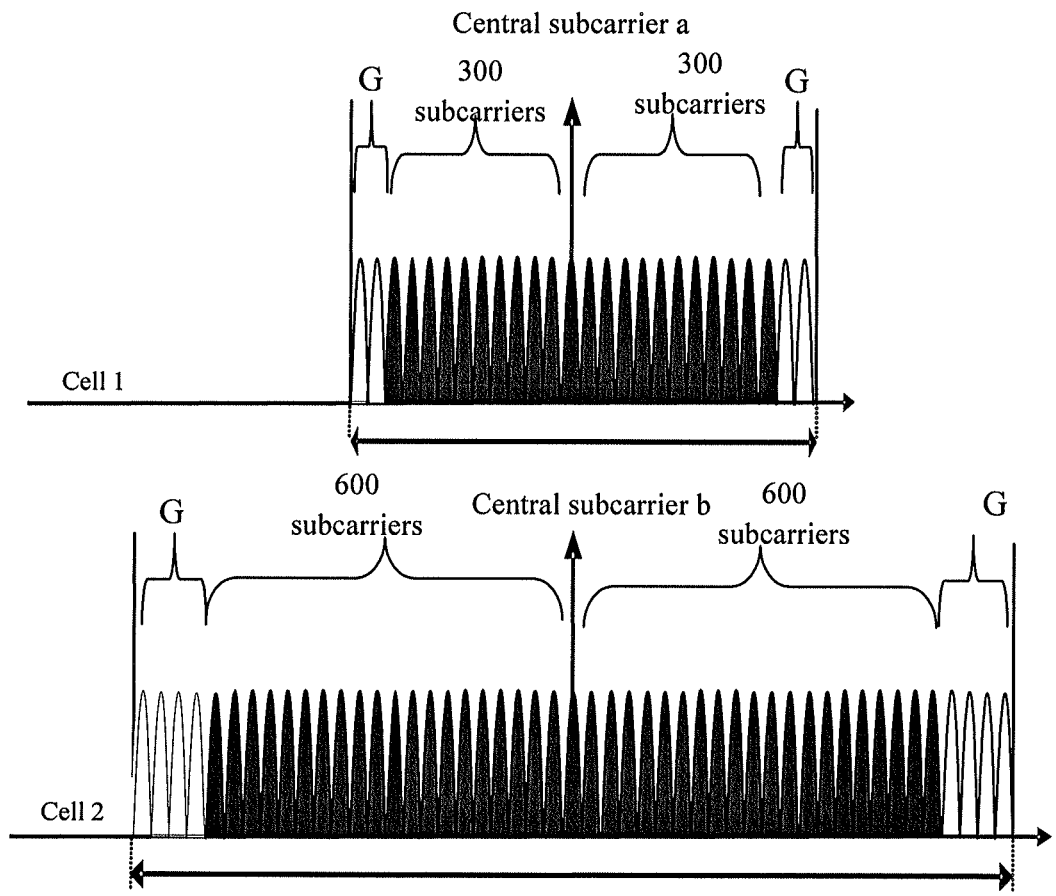
FIG. 19 is a frequency distribution diagram of a method for configuring a central subcarrier according to an embodiment of the present invention.

In FIG. 19, it is assumed that the downlink bandwidth in cell 1 is 10 MHz, and the PDCCH and the PDSCH of the users of the existing communication system and the users of new communication systems fall within a 10 MHz bandwidth. In cell 2, the frequency bandwidth is 20 MHz, and the PDCCH and the PDSCH of the users of the existing communication system and the users of new communication systems fall within a 20 MHz bandwidth. The central subcarrier at the transmitting time of the base station in the two cells is located in the central subcarrier of the transmission bandwidth, and the corresponding frequency position is the same.

The sixth embodiment of the present invention fulfills condition A.

Besides, for either cell 1 or cell 2, if the transmit power is low and the coverage scope is narrow, the required protection bandwidth may be reduced, and corresponding subcarriers suitable for transmitting data increase, which improves resource usage of the system. Therefore, the protection bandwidths corresponding to different frequency bandwidths may be defined according to different transmit powers.

The method above is also applicable to the multi-carrier transmission scenario, but differently, the control channel signals of f2 are also sent by cell 1. The power of the control channel signals of f2 may be 0. The multi-carrier transmission process in this embodiment does not necessarily involve any neighboring cell.

Through the method for configuring central subcarrier in the embodiment above, the virtual central subcarrier is configured in the case of orthogonal transmission of the downlink control channel or multi-carrier transmission so that the existing communication system works normally.

Figure 20:
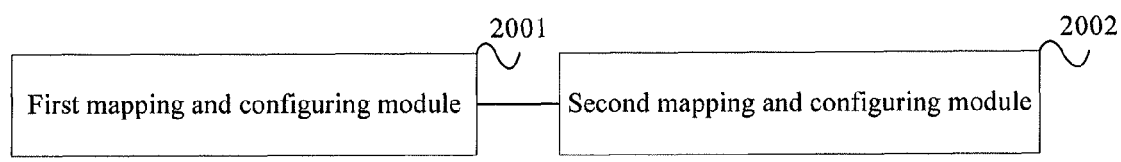
FIG. 20 is a schematic diagram of a device for configuring a central subcarrier according to an embodiment of the present invention.

FIG. 20 is a schematic diagram of a device for configuring a central subcarrier according to an embodiment of the present invention. The device in this embodiment comprises:

a first mapping and configuring module 1901, configured to: map a first downlink control channel onto a part f1 of a downlink bandwidth fW of a cell, and configure a first virtual central subcarrier in f1, where f1 is different or partly different from a bandwidth f2 mapped to a second downlink control channel, an overlap between f1 and f2 is at least one subcarrier, or at least one idle subcarrier exists between f1 and f2, or at least one non-idle subcarrier and at least one idle subcarrier exist between f1 and f2; the first virtual central subcarrier is located on a grid position of a central frequency, a distance between the first virtual central subcarrier and a second virtual central subcarrier configured in f2 is an integer multiple of a frequency domain width of the subcarrier, and physical resource blocks (PRBs) are aligned between the cell and a neighboring cell; and a second mapping and configuring module 1902, configured to map a downlink data channel onto fW of the cell, and configure a central subcarrier on fW.

This embodiment is used to implement the method described in the foregoing embodiments, and is not detailed here any further.

The first virtual central subcarrier is located on the grid position of the central frequency, and a distance between the first virtual central subcarrier and a second virtual central subcarrier configured in f2 is an integer multiple of a frequency domain width of the subcarrier, which may comprise:

the second virtual central subcarrier is located on the grid position of the central frequency, the distance between the first virtual central subcarrier and the second virtual central subcarrier is an integer multiple of the grid frequency domain width of the central frequency, and the distance between the first virtual central subcarrier and the second virtual central subcarrier is an integer multiple of the frequency domain width of the subcarrier.

The bandwidth f2 mapped to a second downlink control channel, comprises the bandwidth f2 of the second downlink control channel mapped to the cell in the case of multi-carrier transmission; and comprises the bandwidth f2 of the second downlink control channel mapped to the neighboring cell in the case of orthogonal transmission of the downlink control channel.

The second mapping and configuring module may be further configured to:

map a downlink data channel onto fW of the cell; and
configure the central subcarrier on the overlapping subcarrier between f1 and f2, or configure the central subcarrier on the idle subcarrier between f1 and f2.

This embodiment may further comprise:

a sending module, configured to send downlink control channel signals and/or downlink reference signals on subcarriers other than the overlapping subcarrier between f1 and f2.

The sending module may be further configured to send signals of PCFICH, and/or PHICH, and/or CRS, and/or CSI-RS on subcarriers other than the overlapping subcarrier between f1 and f2.

This embodiment may further comprise:

the PRBs adjacent to the overlapping subcarrier between f1 and f2 comprise subcarriers other than the overlapping subcarrier between f1 and f2.

This embodiment may further comprise:

a bandwidth adjusting module, configured to: increase the bandwidth occupied in fW and decrease a protection bandwidth occupied in fW when the coverage scope of the cell is less than a first threshold.

This embodiment may further comprise:

a configuring module, configured to set an idle subcarrier or a non-idle subcarrier on the second virtual central subcarrier of the cell, where the idle subcarrier or non-idle subcarrier belongs to a neighboring PRB.

Through the device for configuring central subcarrier in the embodiment above, the virtual central subcarrier is configured in the case of orthogonal transmission of the downlink control channel or multi-carrier transmission so that the existing communication system works normally.

Through the description in the embodiments above, those skilled in the art are clearly aware that the embodiments of the present invention may be implemented through hardware only, or preferably, through software in addition to necessary universal hardware. Therefore, the technical solution of the present invention or its novelty over the prior art may be embodied in a software product. The software product is stored in computer-readable storage media such as computer floppy disk, hard disk and CD-ROM, and incorporates several instructions for instructing a computer device (for example, personal computer, server, or network device) to execute the method specified in any embodiment of the present invention.

Detailed above are only exemplary embodiments of the present invention, but the scope of the present invention is not limited thereto. Any modification or substitution readily conceivable by those skilled in the art within the scope of the technology disclosed herein shall fall within the scope of the present invention. Therefore, the scope of the present invention is subject to the appended claims.

What is claimed is:

1. A method for configuring a central subcarrier, comprising:

mapping, by a base station, a first downlink control channel onto a part (f1) of a downlink bandwidth (fW) of a cell, and configuring a first virtual central subcarrier in f1; and mapping, by the base station, a downlink data channel onto fW of the cell, and configuring, by the base station, a central subcarrier on fW, wherein f1 is different from a bandwidth f2 mapped to a second downlink control channel of the cell or a neighboring cell, an overlap between f1 and f2 is at least one subcarrier, or at least one idle subcarrier exists between f1 and f2, or at least one non-idle subcarrier and at least one idle subcarrier exist between f1 and f2; and the first virtual central subcarrier is located on a grid position of a central frequency, a distance between the first virtual central subcarrier and a second virtual central subcarrier configured in f2 is an integer multiple of a frequency domain width of the subcarrier, and borders of physical resource blocks (PRBs) are aligned between the cell and the neighboring cell.

2. The method according to claim 1, wherein:

the first virtual central subcarrier is located on a grid position of a central frequency, and the distance between the first virtual central subcarrier and the second virtual central subcarrier configured in f2 is an integer multiple of the frequency domain width of the subcarrier, which comprises:

the second virtual central subcarrier is located on the grid position of the central frequency, the distance between the first virtual central subcarrier and the second virtual central subcarrier is an integer multiple of a grid frequency domain width of the central frequency, and the distance between the first virtual central subcarrier and the second virtual central subcarrier is an integer multiple of the frequency domain width of the subcarrier.

3. The method according to claim 1, wherein:

in the case of multi-carrier transmission, the bandwidth f2 mapped to the second downlink control channel comprises the bandwidth f2 of the second downlink control channel mapped to the cell; and in the case of orthogonal transmission of the downlink control channel, the bandwidth f2 mapped to the second downlink control channel comprises the bandwidth f2 of the second downlink control channel mapped to the neighboring cell.

4. The method according to claim 1, wherein the configuring, by the base station, the central subcarrier on fW comprises at least one of the following steps:

configuring, by the base station, the central subcarrier on an overlapping subcarrier between f1 and f2, and configuring, by the base station, the central subcarrier on an idle subcarrier between f1 and f2.

5. The method according to claim 4, further comprising:

sending, by the base station, downlink control channel signals and/or downlink reference signals on subcarriers other than the overlapping subcarrier between f1 and f2.

6. The method according to claim 5, wherein the sending, by the base station, the downlink control channel signals and/or downlink reference signals on the subcarriers other than the overlapping subcarrier between f1 and f2 comprises:

sending, by the base station, signals of PCFICH, and/or PHICH, and/or CRS, and/or CSI-RS on the subcarriers other than the overlapping subcarrier between f1 and f2.

7. The method according to claim 4, wherein physical resource blocks (PRBs) adjacent to the overlapping subcarrier between f1 and f2 comprise subcarriers other than the overlapping subcarrier between f1 and f2.

8. The method according to claim 1, further comprising:

when a coverage scope of the cell is less than a first threshold, increasing by the base station, bandwidth occupied in fW and decreasing, by the base station, protection bandwidth occupied in fW.

9. The method according to claim 1, further comprising:

setting, by the base station, an idle subcarrier or a non-idle subcarrier on the second virtual central subcarrier of the cell, wherein the idle subcarrier or non-idle subcarrier belongs to a neighboring PRB.

10. A device for configuring a central subcarrier, comprising:

a first mapping and configuring unit, configured to: map a first downlink control channel onto a part (f1) of a downlink bandwidth (fW) of a cell, and configure a first virtual central subcarrier in f1, wherein f1 is different from a bandwidth (f2) mapped to a second downlink control channel, an overlap between f1 and f2 is at least one subcarrier, or at least one idle subcarrier exists between f1 and f2, or at least one non-idle subcarrier and at least one idle subcarrier exist between f1 and f2; the first virtual central subcarrier is located on a grid position of a central frequency, a distance between the first virtual central subcarrier and a second virtual central subcarrier configured in f2 is an integer multiple of a frequency domain width of the subcarrier, and physical resource blocks (PRBs) are aligned between the cell and a neighboring cell; and a second mapping and configuring unit, configured to map a downlink data channel onto fW of the cell, and configure a central subcarrier on fW.

11. The device according to claim 10, wherein:

the first virtual central subcarrier is located on a grid position of a central frequency, and the distance between the first virtual central subcarrier and the second virtual central subcarrier configured in f2 is an integer multiple of the frequency domain width of the subcarrier, which comprises:

the second virtual central subcarrier is located on the grid position of the central frequency, the distance between the first virtual central subcarrier and the second virtual central subcarrier is an integer multiple of a grid frequency domain width of the central frequency, and the distance between the first virtual central subcarrier and the second virtual central subcarrier is an integer multiple of the frequency domain width of the subcarrier.

12. The device according to claim 10, wherein:

in the case of multi-carrier transmission, the bandwidth f2 mapped to the second downlink control channel comprises the bandwidth f2 of the second downlink control channel mapped to the cell; and in the case of orthogonal transmission of the downlink control channel, the bandwidth f2 mapped to the second downlink control channel comprises the bandwidth f2 of the second downlink control channel mapped to the neighboring cell.

13. The device according to claim 10, wherein the second mapping and configuring unit is specifically configured to:

map a downlink data channel onto fW of the cell;

configure at least one of the central subcarrier on an overlapping subcarrier between f1 and f2 and a central subcarrier on the idle subcarrier between f1 and f2.

14. The device according to claim 13, further comprising:
a sending unit, configured to send downlink control channel signals and/or downlink reference signals on subcarriers other than the overlapping subcarrier between f1 and f2.

15. The device according to claim 14, wherein the sending unit is specifically configured to:
send signals of PCFICH, and/or PHICH, and/or CRS, and/or CSI-RS on subcarriers other than the overlapping subcarrier between f1 and f2.

16. The device according to claim 13, wherein physical resource blocks (PRBs) adjacent to the overlapping subcarrier between f1 and f2 comprise subcarriers other than the overlapping subcarrier between f1 and f2.

17. The device according to claim 10, further comprising:
a bandwidth adjusting unit, configured to: increase the bandwidth occupied in fW and decrease the protection bandwidth occupied in fW when a coverage scope of the cell is less than a first threshold.

18. The device according to claim 10, further comprising:
a configuring unit, configured to set an idle subcarrier or a non-idle subcarrier on the second virtual central subcarrier of the cell, wherein the idle subcarrier or non-idle subcarrier belongs to a neighboring PRB.

* * * * *